Aug. 26, 1969        F. L. HELLER                3,463,174
               PORTABLE COVER STRUCTURE

Filed Jan. 27, 1967                          4 Sheets-Sheet 1

INVENTOR.
FREDERICK L. HELLER
BY
Frederick L. Heller

Aug. 26, 1969　　　F. L. HELLER　　　3,463,174
PORTABLE COVER STRUCTURE
Filed Jan. 27, 1967　　　　　　　4 Sheets-Sheet 2
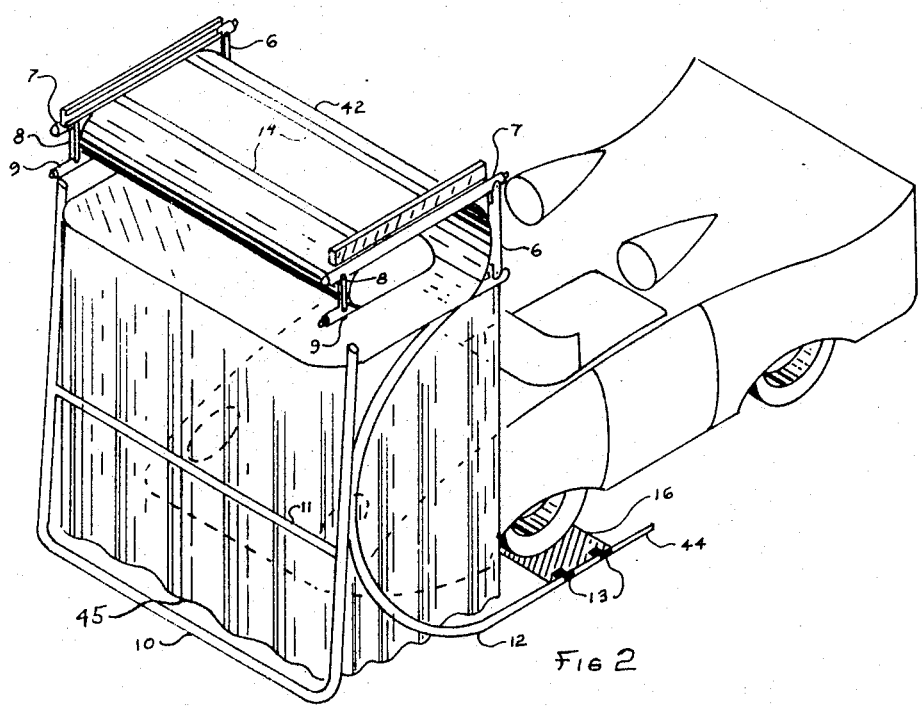
INVENTOR.
FREDERICK L. HELLER
BY Frederick L. Heller

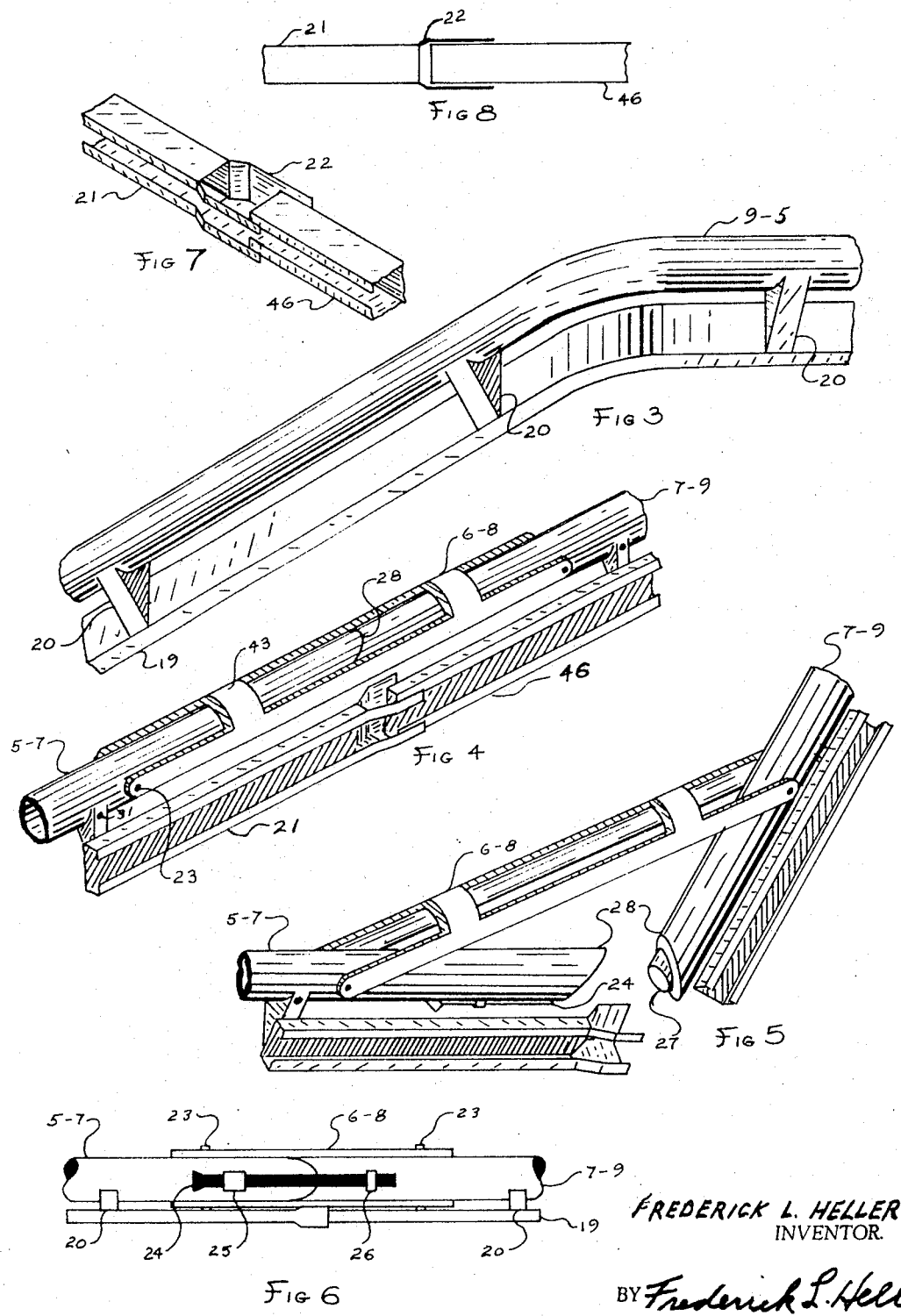

Aug. 26, 1969  F. L. HELLER  3,463,174
PORTABLE COVER STRUCTURE
Filed Jan. 27, 1967  4 Sheets-Sheet 4
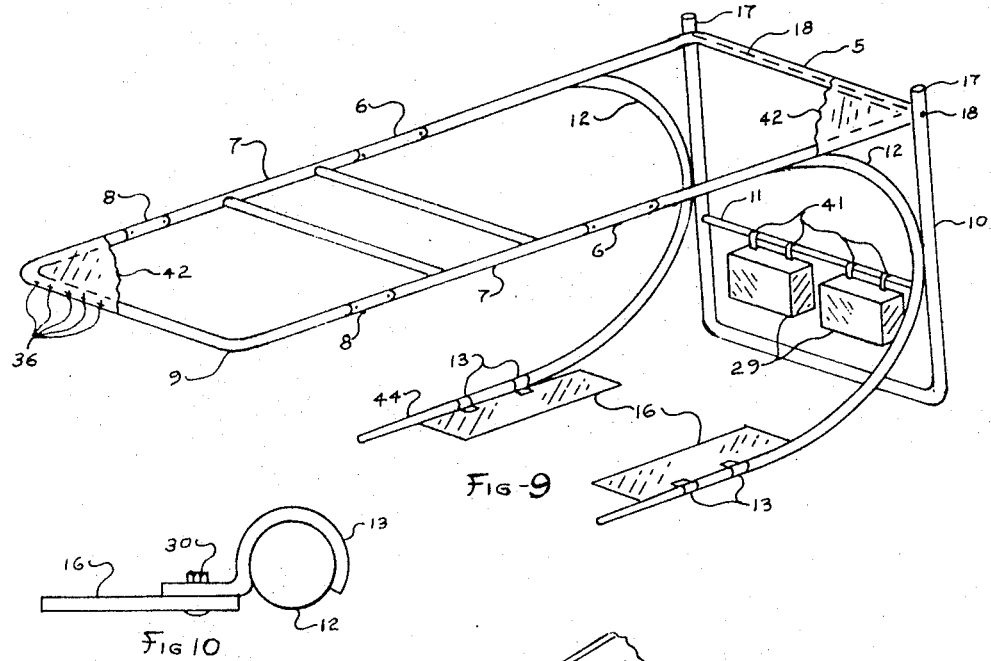
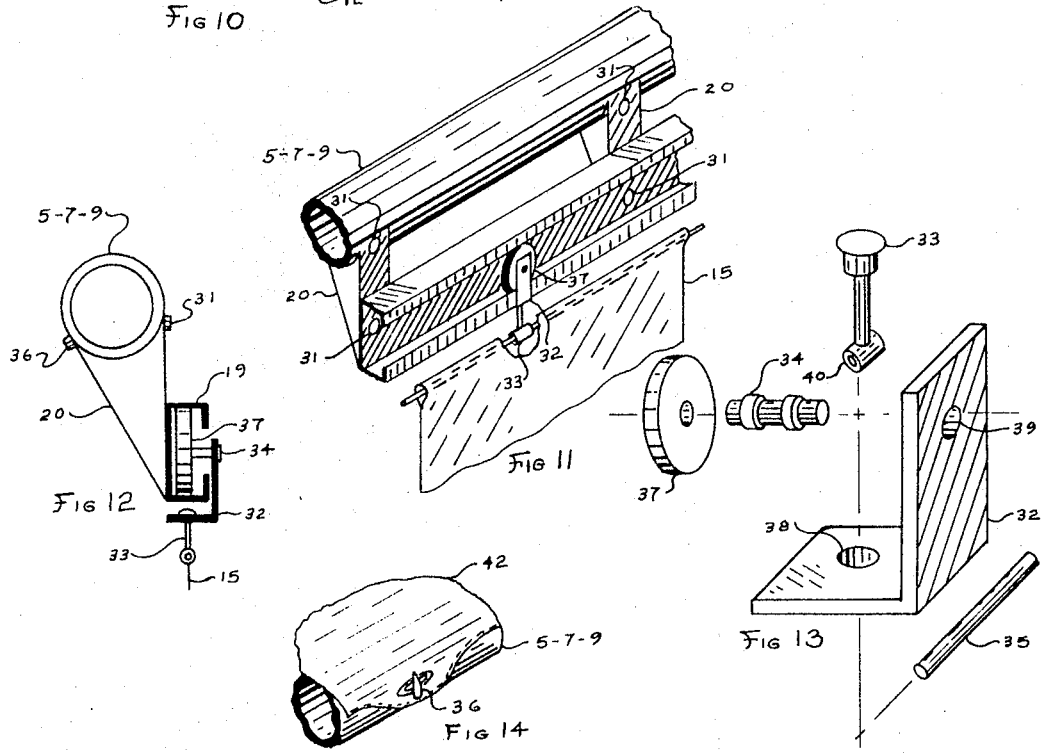
INVENTOR.
FREDERICK L. HELLER
BY
Frederick L Heller

United States Patent Office 3,463,174
Patented Aug. 26, 1969

3,463,174
PORTABLE COVER STRUCTURE
Frederick L. Heller, 205A S. Brevard Ave.,
Cocoa Beach, Fla. 32931
Filed Jan. 27, 1967, Ser. No. 613,391
Int. Cl. E04b 1/347; A45f 1/16; E04f 10/00
U.S. Cl. 135—1                                 1 Claim

ABSTRACT OF THE DISCLOSURE

A configuration having foldable frame sections with adjacent curtain track attached, pivot hinged to come together to form a continuous covered level frame with an uninterrupted curtain track for a complete enclosing curtain; which is attached to a cantilever structure for support.

---

This invention relates to improvements in the design of portable cover structure configurations.

Many of the existing cover type structure configurations that are in use to provide an overhead cover for vehicles such as an automobile in parking areas and driveways are completely rigid, have four corner support posts, do not provide any or little side protection, and are not completely portable.

It has been found that the corner support posts at the entrance end of a fixed cover structure greatly restricts the available maneuvering area necessary for driving a vehicle into the space covered without the danger of hitting the corner supports. In addition, although the space is protected overhead, the sides are exposed to the ravages of the atmospheric weather elements such as rain, snow, wind, dirt, sand, etc.

The present invention relates to the construction of a portable cover structure configuration that can be classed in the same group of items as outdoor lawn and patio furniture. Therefore, this type of design lends itself to simplicity and less cost than most similar type portable cover structures. This present invention can cover a larger space for the purpose of protecting a vehicle such as an automobile, or can provide a portable enclosed space area for storage, use of persons or children at play. This invention can be erected in carports, parking areas, driveways, on patios, beaches, and used as a cabana or tent-like portable cover structure.

Simply, this invention provides a structure framework formed from a multiplicity of stationary and movable parts. This structure may be readily operated from a fully expanded completely enclosed condition on top and sides, or intermediate stages of opening and folding back to provide various stable stages of overhead and side covering, and finally for all practical purposes, complete exposure of the space therebeneath. To complete the aforementioned structure framework of the portable cover structure configuration, a material covers the roof frame and a movable protective side curtain entirely encloses the space covered by the portable cover structure which is made of any suitable material, flexible or rigid, such as fabric, plastic, metal or similar material.

The present invention provides a new simplicity in design of this general character: there is provided an overhead cover structure combining the cantilever principle of support from one end; there is provided a new counterbalancing system, whereby, by means of a counter cantilever part support structure toward ground level the design is afforded a stable level cover state parallel to the ground, there is provided a new linkage between certain structural parts of the aforementioned framework, whereby, certain joint hinged parts of sufficient design are attached in relation to others in order that the folding back and expanding of the design may be accomplished with an orderly array of the joint hinge parts in relation to the other parts of the portable cover structure.

Accordingly it is one object of the present invention to provide a portable cover structure configuration that is light weight, simple in design, that lends itself more readily to portability and less cost in manufacturing.

Another object of the present invention is to provide for all practical purposes a complete enclosed cover or exposure over a specified space.

Another object of the present invention is to incorporate a new joint hinge design that will allow a logical multiple fold-over of the roof frame cover structure and a complete movable or removable side curtain design for exposure purposes.

A further object of the present invention is to provide cover for a space of sufficient size to protect a vehicle such as an automobile and not restrict the area necessary for maneuvering into the portable cover structure.

A further object of the present invention is to provide attached level plates to the lower counter cantilever structure which are not necessarily essential because normally no extreme single stressed parts are involved in this invention. These ground level plates will also provide further stabilization when a vehicle such as an automobile or stored items occupies the included space covered by the portable cover structure.

A still further object of the present invention is to provide a portable type cover configuration of such adequate size that it can be readily asserbled for use or disassembled for transport on top or in an automobile or vehicle.

A further object of the present invention is to provide a foldable protective cover structure configuration wherein the joint hinged parts are placed and controlled to the extent necessary during expansion and folding of the structure to facilitate these operations.

A still further object of the present invention is to provide a foldable protective cover structure configuration which may be readily expanded or folded and which has intermediate stable conditions between the fully expanded and folded states.

FIG. 2 shows the portable cover structure with the top metal frame and fabric structure part folded back to expose the automobile contained therebeneath.

FIG. 3 shows the design of the curtain wheel track attached to that section of the top roof structure of the portable cover structure and shows the relation of track position to each section frame.

FIG. 4 shows the typical joint hinge design that holds two portions of the top roof frame together in the closed position.

FIG. 5 shows the typical joint hinge design that holds two portions of the roof frame together in the partially open position.

FIG. 6 shows the design relationship in the closed and locked position of the curtain wheel track and joint hinge connecting two parts of the top roof frame of the portable cover structure.

FIG. 7 shows the curtain wheel track portion that comes together to make a closed track in conjunction with the joint that holds two portions of the top roof frame together in the closed position.

FIG. 8 shows the top view of the curtain wheel track portion that comes together to make a closed track in conjunction with the joint that holds two portions of the top roof frame together in the closed position.

FIG. 9 shows the fully expanded portable cover structure with the fabric covered top, counter weights, and car wheel stabilizing plates.

FIG. 10 shows the typical design for holding the car wheel stabilizing plates in position relative to the portable cover structure.

FIG. 11 shows a section of the design relation of the curtain, wheel, track, and track tie components to and with respect to a portion of the roof frame of the portable cover structure.

FIG. 12 shows an end or side view of the design relation of the curtain, wheel, track, and track tie components to and with respect to a portion of the roof frame of the portable cover structure.

FIG. 13 shows a related exploded view of the parts that make up the wheel assembly that holds the curtain up by position in the wheel track.

FIG. 14 shows the design how the top cover fabric material will be fastened to the top roof frame structure.

Figure 1:
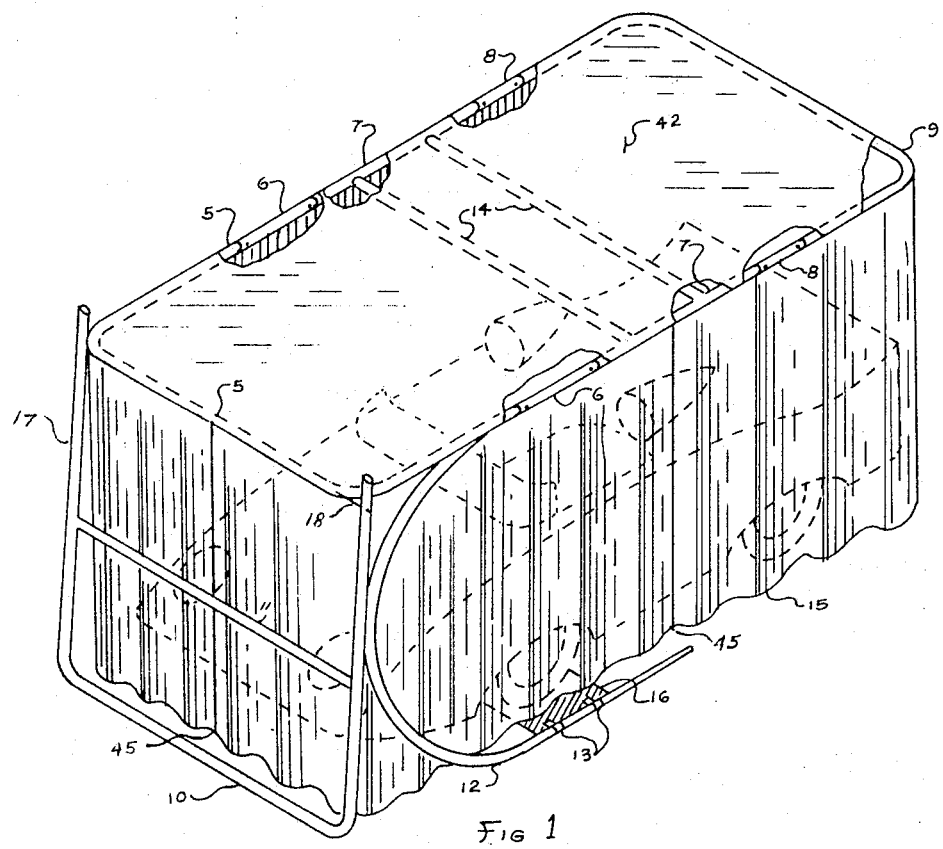
FIG. 1 shows the portable cover structure completely expanded and enclosed with an automobile contained therebeneath.

By consideration of the following description of a chosen model design of the present invention and in conjunction with the accompanying drawings in which like numbers refer to like or corresponding parts, and wherein: referring to the drawings, the portable cover structure is comprised of parts 5, 7, 9 jointed together at points 28 by joint hinges 6 and 8 to form a roof frame covered with a fabric like material 42. This is supported in a horizontal position by a rod like support 18 between the closed end of roof frame portion 5 and the top ends of legs 17 or fastened directly to legs 17 of frame portion 10. The second point of support is the roof frame portion near the joint of 6 attached to top of the upper end of the upper cantilever portion of the frame support 12. The circular frame supports 12 are each fastened perpendicular to a leg portion 17 of the frame structure 10, with a cross bar support 11 between the legs 17 of frame support 10.

Considering the foregoing basic components in greater detail, the basic roof frame elements 5, 7, 9 are joined together by a hinge joint assembly 6 and 8. This allows the roof frame ends 28 to pivot at points 23 and come together into a cross brace portion 43 of 6 and 8. Due to the overbalance weight of the roof frame portions 7 and 9 with respect to points 23 the roof frame portion ends at the points 28 stay together. They are locked in place by means of a metal tongue through slots 25 and 26. Pulling mental tongue 24 out of slot 26 by sliding back in slot 25 enables the 9 and/or 7 roof frame portions to be folded back partially or completely without affecting the roof frame cover material 42.

The curtain 15 attached to multiple numbers of wheel assemblies (FIG. 13) in track 19 attached to all inside portions of roof frame portions 5, 7, 9 has to manually be pushed back on track 19 toward the closed end of 5 to be able to fold roof frame sections 7 and 9 back. With the curtain 15 pushed back as far as it will go from both sides of roof frame portions 7 and 9, they can be folded back if it is determined necessary. For additional support and stability the center roof frame structure 7 has two cross bar supports 14.

Considering the circular vertical support frames 12 design the upper cantilever end attached to roof frame near 6 provides with rods 18 two parallel lines of suuport for the roof frame at four points. The circular vertical support frames 12 are attached by suitable fastening to the legs 17 of the inclined basic frame 10 so as to form a stable four point foundation to hold up the roof frame structure 5, 6, 9 in a parallel position to the ground. Additional stability is also attained because of the reverse cantilever effect of the circular vertical frame 12 ground level leg 44 which extends to a distance approximately to a length equivalent to the middle of roof frame portion 7. This is sufficient to overcome the center of gravity related to roof frame 5, 7, 9 overhead. By means of this design of the portable cover structure a maximum of space is covered with a minimum of interfering point support to obtain adequate all around stability.

To further explain the curtain track 19 design it is attached by means of multiple components 20 to the roof frame structure at points 31 by means of suitable fasteners. The track 19 extends completely around the inside of the roof frame structure 5, 7, 9 and is adequately fastened to the roof frame structure 5, 7, 9 by a multiple number of components 20. Sections are continuously fixed or attached together except at points 28 where the track 19 ends interlock together at 21, 22, 46 for working in conjunction with joint hinges 6 and 8 to enable the top roof frame assembly to fold back. The 22 portion of the 21 section is stress expanded sufficiently to accommodate an overlapping fit respectively of track portion 21 into track portion 46 considering their O.D. and I.D. dimensions to form a part of track 19 or a similar result can be accomplished by an attachment that serves the same purpose. The typical joint hinge 6 and 8 holding the structure ends of the roof frame portions 5, 7, 9 together at points 28 pivot at points 23 to allow fold back of the roof frame portions 7, 9 without interfering with the fabric cover 42 and the separation of the roof frame portion ends at point 28. A guide sleeve 27 is installed in one end of the roof frame portions and both ends at 28 are cut diagonally opposite so as to facilitate their coming together to form a continuous roof frame structure. The typical joint hinge 6 and 8 has a curve shaped cross head brace 43 solid or divided which allows the mated ends of the roof frame portion to come together and nestle within the cross head brace 43 to support and line up the top portions 5, 7, 9 as a complete continuous roof frame structure. The lock tongue bar 24 will slide through slot 25 into slot 26 to lock joints at points 28 together in the closed position.

The curtain wheel assembly, FIG. 13, is fabricated in part or assembled as a complete assembly unit so that the track wheel 37, frame 32, support rod 34, and vertical pivot free component 33 will allow the wheel 37 to thread and ride in curtain track 19 and hold the curtain by means of the flexible or rigid type rod 35 through 40 in a vertical line with the track wheel 37. The free pivoting action of component 33 is necessary to allow the curtain 15 to fold together toward one end or another of the roof frame structure for accessibility to the enclosed space of the portable cover structure and to allow the folding back of roof frame portions 7, 9.

The vertical curtain 15 is made of one or more sections with suitable fasteners 45 for delatching purposes to enable easy access to the enclosed space covered by the portable cover structure from either side or ends. The curtain wheel assemblies (FIG. 13) are threaded into the open track end 46 of frame section 7 at joint 8 when frame section 9 is folded back. When section 9 is unfolded to the closed position at joint 8 a continuous uninterrupted track is formed for the curtain wheel assemblies (FIG. 13) to roll on. The counterweights 29 hung at 41 on cross bar 11 are only necessary if desired to counterbalance the expanded portable cover structure while threading the curtain wheel assemblies, FIG. 13, into the curtain track to overcome possible weight concentration during this operation of the curtain which is hung and distributed along the track 19. It is optional to retain the counterweights 29 for greater stability.

The roof frame structure fabric 42 is fabricated and overlapped so the edges fit around the surfaces of the roof frame structure and is held in place by a multiple of suitable fasteners 36. However, it is not fastened at the fabric edges to the roof frame structure at the position of the typical joint hinges 6 and 8. It is so designed that the fabric 42 edges cover and stretch across the typical joint hinges 6 and 8 in the closed position of the roof frame portion ends 28. In this manner a complete uniform covering of the expanded roof frame structure 5, 7, 9 is obtained.

The stabilizing plates 16 are optional but can be used to increase the stabilized condition of the portable cover structure when a vehicle or other storage items are enclosed therebeneath. The stabilizing plates are fastened to the lower portions 44 of the circular vertical support frames by clamps 13.

I claim:

1. A portable cover for automobiles or the like comprising a support structure including ground engaging means and a fixed frame held in horizontal position above said ground engaging means, a plurality of folding hingedly interconnected frame sections hingedly connected to the fixed frame for partial or complete exposure of the space beneath the folding frame sections, adjacent parallel curtain track means attached to each of said fixed and folding frame sections, said hinge connections including dual pivoted yoke members providing horizontal cantilever support for said folding frame sections when unfolded, coupling means on confronting ends of the frame sections and on confronting ends of said track means to form a continuous horizontal roof frame and uninterrupted track means when said folding frame sections are unfolded, flexible cover material secured to said frames forming a roof, curtain wheel assemblies on said tracks and a curtain hung therefrom movable from an enclosing position around the roof frame to a retracted position on the fixed frame thereby allowing said folding frame sections to be folded on top of said fixed frame when desired.

References Cited

UNITED STATES PATENTS

| | | | |
|---|---|---|---|
| 1,257,535 | 2/1918 | Sampson | 135—5 |
| 1,988,260 | 1/1935 | Berghoff | 135—8 X |
| 2,130,919 | 9/1938 | Erickson et al. | 135—4 |
| 3,019,803 | 2/1962 | Moody | 135—4 |
| 3,266,503 | 8/1966 | Hoiness et al. | 135—4 |

FOREIGN PATENTS 223,081   7/1959   Australia.

KENNETH DOWNEY, Primary Examiner

U.S. Cl. X.R.

135—4, 8